3,035,985
CHEWABLE FATTY COATING OF IRON PARTICLES

Lewis E. Stoyle, Jr., Westfield, Philip A. Ouellette, Rahway, and Edward J. Hanus, Palisade, N.J., assignors to Merck & Co., Inc., Rahway, N.J., a corporation of New Jersey
No Drawing. Filed Sept. 30, 1959, Ser. No. 843,371
4 Claims. (Cl. 167—82)

This invention relates to pharmaceutical preparations and more particularly to coated iron preparations which are substantially tasteless.

The use of reduced iron and various other iron compositions for the treatment and prevention of iron deficiencies in humans and animals is well known. Most of these compositions today are administered in the form of tablets, capsules, elixirs and the like. However, because of their inherently unpleasant taste, which is primarily attributable to the presence of iron contained therein, these compositions are difficult to formulate into a palatable product. Various types of formulations have been suggested to overcome the taste problem, but, for the most part, these formulations are generally not completely satisfactory. In general, the taste problem has been attacked by various techniques which were aimed at masking the taste of these compositions by substituting for their undesirable and unpalatable flavor an overriding or overwhelming flavor which was somewhat more agreeable to one taking these compositions. These techniques included the use of flavoring agents in tableting or capsule-coating operations and the use of various flavored solutions and emulsions.

However, the addition of a masking flavor is not a completely satisfactory technique because the objectionable flavor of the iron composition in most instances manifests itself in the phenomenon of aftertaste. Thus, masking the flavor of the iron compositions is only partly effective in solving the flavor problem.

According to the present invention, it has been found that fat insoluble iron compositions can be rendered substantially tasteless by coating these compositions with a fatty composition which is a solid at room temperature. The fatty composition used for coating the various iron compositions should have a melting point of at least 45° C. in order that the preparation of the coated iron compositions may be accomplished with facility and in order to insure the stability of these coated iron compositions at ordinary temperatures.

It should be noted that when reference is made herein to "iron compositions," it is meant to include such solid materials as reduced iron and other forms of iron compounds which contain iron in an assimilable form and are suitable for use in treating and preventing iron deficiencies.

The coating process involves the preparation of a suspension of the particular iron composition having a particle size of at least about 200 mesh, in a molten fatty composition and the chilling of the resulting suspension to produce solid spheroidal particles of the iron composition having a coating of the fatty composition. By the term "spheroidal," it is means discrete rounded particles which may be of spherical or nearly spherical shape.

The solid iron compositions which may be used in practicing this invention must, of course, be pharmaceutically and medically acceptable for use in preventing and treating iron deficiencies. In addition, since the coatings are produced by a process of chilling a suspension of the iron composition in a fatty composition, it is essential that the iron composition be substantially insoluble in the fatty composition. With these requirements in mind, iron compositions having particularly objectionable tastes, such as, for example, reduced iron, ferrous sulfate, ferrous gluconate, ferrous glutamate, ferric pyrophosphate, ferric ammonium citrate and the like may be used. Since the objectionable taste of the iron compositions is primarily attributable to the presence of iron contained therein, this invention contemplates the use of various other solid iron compositions which meet the requirements as defined above.

Fatty compositions having a melting point of at least 45° C. and not greater than a temperature at which the iron composition present in the molten fatty suspension would tend to decompose, and consisting entirely or predominantly of a mixture of saturated fatty acids having from 14 to 18 carbon atoms, may be used in practicing the instant invention. Fatty compositions consisting entirely of mixtures of saturated fatty acids, such as, for example, stearic and palmitic, stearic and myristic, palmitic and myristic, stearic, palmitic and myristic, are quite satisfactory. Fatty compositions consisting predominantly of a mixture of saturated fatty acids and containing up to about 11% by weight unsaturated fatty acid selected from the group consisting of oleic acid, linoleic acid and mixtures thereof may be used with equal facility. Fatty compositions of the latter type are particularly useful and preferred by reason of their relative cheapness and availability. Specifically, fatty compositions commercially available from Emery Industries, Inc., Cincinnati, Ohio, under the name Emersol, such as, for example, Emersol 110, Emersol 120, Emersol 132, Emersol 140 and Emersol 150 are especially valuable. In each case it is, of course, essential that the melting point be in the above-described range, that the fatty compositions be pharmaceutically and medically acceptable, and that no undesirable taste be imparted to the preparations of this invention by the fatty composition itself. With these requirements in mind, any of the above-mentioned fatty or waxy compositions would be suitable for use in the preparation of the instant invention.

The iron compositions may be used in proportions of up to about 50% by weight of the mixture of iron composition and fatty composition with proportions of up to about 35% preferred.

The process of coating the iron composition may be accomplished in a variety of ways so long as the product obtained is the result of a chilling action upon a suspension of the iron composition in a molten fatty composition.

Various chilling techniques are known. For example, the hot suspension may be dropped into a cooled bath of water or other suitable known non-solvent for the suspension, whereby droplets of the suspension are caused to solidify. Another technique is the use of a spinning disc type of apparatus. This is operated by causing the hot suspension to impinge upon the surface of a spinning disc, which divides the suspension into small globules and scatters them into a chilling zone, which serves for chilling the suspension, such as by provision of a cooling means therein. A particularly desirable and preferred means of accomplishing this result is the use of a spray chilling technique. For operation of this technique the suspension of the iron composition in the molten fatty composition is passed through heated lines to a heated nozzle and thereupon sprayed into a chilling zone or chamber which is maintained at ambient or lower temperatures, whereupon discrete coated particles of the preparation solidify upon being sprayed into this chilling zone.

The product of any of these chilling methods is a particulate mass in which the particles are individually steroidal in shape. These particles are found to be homogeneous in appearance and to possess a uniform coating of the fatty composition utilized in the preparation of the suspension.

The products of this invention which contain biologically available iron are essentially tasteless and may be readily formulated into various types of tablets and other pharmaceutical forms as desired. Because of the objectionable taste of the iron composition used, exemplified by the disagreeable taste of reduced iron, ferrous sulfate, and ferric pyrophosphate, for example, the products of this invention are particularly useful in the form of chewable tablets. In addition to the coated preparations of this invention, the formulated tablets may contain flavoring agents, lubricants, coloring materials and the like as desired. However, the inclusion of a flavoring agent in the tablets formulated from the preparations of this invention is not at all necessary and might be dispensed with, if desired, since the tablets would be otherwise substantially tasteless.

The instant invention will be better understood by reference to the following examples which are intended for purposes of illustration only and are not intended as in any way limiting the scope of this invention, which is defined in the appended claims.

Example 1

A quantity of 150 g. of Emersol 132 containing about 49% by weight of stearic acid, 50% palmitic acid and 1% myristic acid was melted and maintained at a temperature of 70° C. and 50 g. of reduced iron (about 200 mesh) was added with stirring. The heated mixture was continuously stirred until a smooth, homogeneous suspension was obtained. The suspension was passed through heated lines to an external mixing pneumatic nozzle maintained at a temperature of 100° C. and sprayed through the heated nozzle into a chilling chamber containing circulating air at 25° C. The resulting product was found to be substantially tasteless.

Example 2

A quantity of 500 g. of Emersol 132 was melted by heating to a temperature of 70° C. To the resulting heated melt was added 500 g. of reduced iron (about 200 mesh) with constant stirring. The mixture was stirred until a smooth, homogeneous suspension was obtained. The suspension was passed through heated lines to a spinning disc maintained at 100° C. and atomized into a chilling chamber containing circulating air at 23° C. The resulting product was found to be substantially tasteless.

Example 3

The procedure of Example 2 was followed except that Emersol 140 containing about 27% by weight of stearic acid, 70% palmitic acid, 1% myristic acid and 2% oleic acid was substituted for Emersol 132. The product was found to be substantially tasteless.

Example 4

A quantity of 120 g. of Emersol 132 was melted and maintained at a temperature of 83° C. and 60 g. of ferrous sulfate exsiccated (325 mesh) was added with stirring. The heated mixture was continuously stirred until a smooth, homogeneous suspension was obtained. The suspension was passed through heated lines to an external mixing pneumatic nozzle maintained at a temperature of 100° C. and sprayed through the heated nozzle into a chilling chamber containing circulating air at 23° C. The resulting product was found to be substantially tasteless.

Example 5

The procedure of Example 4 was followed except that 75 g. of Emersol 132 and 75 g. of ferrous sulfate exsiccated (325 mesh) were used. As in the preceding examples the resulting product was found to be substantially tasteless.

Example 6

The procedure of Example 4 was followed except that Emersol 150 containing about 82% by weight of stearic acid, 15% palmitic acid, 2% myristic acid and 1% oleic acid was substituted for Emersol 132 and a feed temperature of 93° C. was used. The product was found to be substantially tasteless.

Example 7

The process of Example 2 was followed except that ferrous sulfate exsiccated (325 mesh) was substituted for reduced iron. The resulting product was found to be substantially tasteless.

Example 8

A quantity of 150 g. of a fatty composition containing about equal parts by weight of stearic and palmitic acid was melted and maintained at a temperature of 75° C. and 50 g. of ferrous sulfate exsiccated (325 mesh) was added with stirring. The heated mixture was continuously stirred until a smooth, homogeneous suspension was obtained. The suspension was passed through heated lines to an external mixing pneumatic nozzle maintained at a temperature of 100° C. and sprayed through the heated nozzle into a chilling chamber containing circulating air at 25° C. The resulting product was found to be substantially tasteless.

Example 9

A quantity of 450 g. of Emersol 132 was melted by heating to a temperature of 75° C. To the resulting heated melt was added 450 g. of ferric pyrophosphate soluble (about 200 mesh) with constant stirring. The mixture was stirred until a smooth, homogeneous suspension was obtained. The suspension was passed through heated lines to a spinning disc maintained at 100° C. and atomized into a chilling chamber containing circulating air at 23° C. The resulting product was found to be substantially tasteless.

Example 10

A quantity of 450 g. of Emersol 120 containing about 41% by weight of stearic acid, 51% palmitic acid, 2% myristic acid and 6% oleic acid was melted by heating to a temperature of 75° C. To the resulting heated melt was added 450 g. of ferric pyrophosphate soluble (about 200 mesh) with constant stirring. The mixture was stirred until a smooth, homogeneous suspension was obtained. The suspension was passed through heated lines to an external mixing pneumatic nozzle maintained at a temperature of 100° C. and sprayed through the heated nozzle into a chilling chamber containing circulating air at 25° C. The resulting product was found to be substantially tasteless.

Example 11

The procedure of Example 10 was followed except that Emersol 110 containing about 39% by weight of stearic acid, 48% palmitic acid, 2% myristic acid, 10% oleic acid and 1% linoleic acid was substituted for Emersol 120. The product was found to be substantially tasteless.

Example 12

A quantity of 120 g. of Emersol 132 was melted and maintained at a temperature of 70° C. and 60 g. of ferrous gluconate (about 200 mesh) was added with stirring. The heated mixture was continuously stirred until a smooth, homogeneous suspension was obtained. The suspension was passed through heated lines to an external mixing pneumatic nozzle maintained at a temperature of 100° C. and sprayed through the heated nozzle into a chilling chamber containing circulating air at 25° C.. The resulting product was found to be substantially tasteless.

Various changes and modifications of the invention can

What is claimed is:

1. A chewable tablet preparation comprising a pharmaceutically and medically acceptable iron composition and, as a coating for particles thereof, a pharmaceutically and medically acceptable fatty composition having a melting point of at least 45° C. and comprised essentially of a mixture of saturated fatty acids having from 14 to 18 carbon atoms, said preparation being palatable when chewed.

2. The preparation of claim 1 wherein the fatty composition is comprised of a mixture of saturated fatty acids having from 14 to 18 carbon atoms and up to about 11% by weight of an unsaturated fatty acid selected from the group consisting of oleic acid, linoleic acid and mixtures thereof.

3. The preparation of claim 1 wherein the fatty composition is essentially a mixture of stearic acid and palmitic acid.

4. The preparation of claim 1 wherein the fatty composition is essentially a mixture of about equal parts by weight of stearic acid and palmitic acid.

References Cited in the file of this patent

FOREIGN PATENTS

| | | |
|---|---|---|
| 285,091 | Great Britain | June 10, 1929 |
| 543,309 | Great Britain | Feb. 19, 1942 |